(12) United States Patent
Faul et al.

(10) Patent No.: US 8,687,172 B2
(45) Date of Patent: Apr. 1, 2014

(54) OPTICAL DIGITIZER WITH IMPROVED DISTANCE MEASUREMENT CAPABILITY

(75) Inventors: Ivan Faul, Boulder, CO (US); Dennis John Toms, Estes Park, CO (US)

(73) Assignee: Ivan Faul, Boulder, CO (US)

( * ) Notice: Subject to any disclaimer, the term of this patent is extended or adjusted under 35 U.S.C. 154(b) by 0 days.

(21) Appl. No.: 13/445,284

(22) Filed: Apr. 12, 2012

(65) Prior Publication Data

US 2012/0262695 A1    Oct. 18, 2012

Related U.S. Application Data

(60) Provisional application No. 61/475,034, filed on Apr. 13, 2011.

(51) Int. Cl.
*G01C 3/08* (2006.01)

(52) U.S. Cl.
USPC ......... 356/3.13; 356/3.01; 356/3.1; 356/4.01; 356/5.01

(58) Field of Classification Search
USPC .................. 356/3.01–28.5, 139.01–139.1
See application file for complete search history.

(56) References Cited

U.S. PATENT DOCUMENTS

| | | |
|---|---|---|
| 3,733,129 A | 5/1973 | Bridges |
| 4,474,180 A | 10/1984 | Angulo |
| 4,737,032 A | 4/1988 | Addleman et al. |
| 5,198,877 A | 3/1993 | Schulz |
| RE35,816 E | 6/1998 | Schulz |
| 5,782,771 A | 7/1998 | Hussman |
| 5,828,770 A | 10/1998 | Leis et al. |
| 5,829,444 A | 11/1998 | Ferre et al. |
| 5,850,289 A | 12/1998 | Fowler et al. |
| 5,907,395 A | 5/1999 | Schulz et al. |
| 5,969,822 A | 10/1999 | Fright et al. |
| 6,061,644 A | 5/2000 | Leis |
| 6,069,700 A * | 5/2000 | Rudnick et al. ............... 356/511 |
| 6,094,007 A | 7/2000 | Faul et al. |
| 6,122,541 A | 9/2000 | Cosman et al. |
| 6,144,875 A | 11/2000 | Schweikard et al. |
| 6,212,029 B1 | 4/2001 | Fioravanti |
| 6,216,029 B1 | 4/2001 | Paltieli |
| 6,256,016 B1 | 7/2001 | Piot et al. |
| 6,288,785 B1 | 9/2001 | Frantz et al. |
| 6,314,310 B1 | 11/2001 | Ben-Haim et al. |
| 6,442,416 B1 | 8/2002 | Schultz |

(Continued)

FOREIGN PATENT DOCUMENTS

| | | |
|---|---|---|
| JP | 2004-110184 A | 4/2004 |
| KR | 10-2001-0097765 A | 11/2001 |
| WO | 2005/074653 A2 | 8/2005 |

OTHER PUBLICATIONS

International Search Report and Written Opinion issued in PCT Application No. PCT/US2012/033466, mailed on Sep. 3, 2012.

(Continued)

*Primary Examiner* — Luke Ratcliffe
(74) *Attorney, Agent, or Firm* — The Marbury Law Group, PLLC

(57) ABSTRACT

Systems and methods improve the accuracy of spatial coordinate measurements by optical digitizers by obtaining a separate distance measurement, which may be via direct ranging rather than triangulation, and combining the distance measurement with the spatial coordinate measurements to improve the accuracy of the three-dimensional spatial coordinate measurement.

38 Claims, 6 Drawing Sheets

(56) References Cited

U.S. PATENT DOCUMENTS

| | | |
|---|---|---|
| 6,476,378 B2 | 11/2002 | Nougaret et al. |
| 6,478,432 B1 | 11/2002 | Dyner |
| 6,498,602 B1 | 12/2002 | Ogawa |
| 6,512,838 B1 | 1/2003 | Rafii et al. |
| 6,608,688 B1 | 8/2003 | Faul et al. |
| 6,611,141 B1 | 8/2003 | Schulz et al. |
| 6,611,344 B1 | 8/2003 | Chuang et al. |
| 6,611,617 B1 | 8/2003 | Crampton |
| 6,675,040 B1 | 1/2004 | Cosman |
| 6,709,116 B1 | 3/2004 | Raskar et al. |
| 6,714,310 B1 | 3/2004 | Tanaka et al. |
| 6,724,930 B1 | 4/2004 | Kosaka et al. |
| 6,741,363 B1 | 5/2004 | Kaupert |
| 6,788,286 B2 | 9/2004 | Travers et al. |
| 6,829,384 B2 | 12/2004 | Schneiderman et al. |
| 6,847,360 B2 | 1/2005 | Yahashi |
| 6,980,302 B2 | 12/2005 | Knighton et al. |
| 7,009,717 B2 | 3/2006 | Coppenolle et al. |
| 7,106,885 B2 | 9/2006 | Osterweil et al. |
| 7,204,428 B2 | 4/2007 | Wilson |
| 7,397,464 B1 | 7/2008 | Robbins et al. |
| 7,429,920 B2 | 9/2008 | Smythe et al. |
| 7,646,379 B1 | 1/2010 | Drennan et al. |
| 7,742,804 B2 | 6/2010 | Faul |
| 7,751,868 B2 | 7/2010 | Glossop |
| 2002/0175994 A1 | 11/2002 | Sakakibara et al. |
| 2002/0193685 A1 | 12/2002 | Mate et al. |
| 2003/0040698 A1 | 2/2003 | Makin et al. |
| 2003/0090646 A1* | 5/2003 | Riegl et al. ............... 356/3 |
| 2004/0039312 A1 | 2/2004 | Hillstead et al. |
| 2004/0150836 A1 | 8/2004 | Kraus |
| 2004/0158146 A1 | 8/2004 | Mate et al. |
| 2004/0179001 A1 | 9/2004 | Morrison et al. |
| 2005/0069172 A1 | 3/2005 | Uchiyama |
| 2007/0106152 A1 | 5/2007 | Kantrowitz et al. |

OTHER PUBLICATIONS

International Search Report and Written Opinion issued in PCT Application No. PCT/US2011/046557, mailed on Feb. 24, 2012.

Polhemus, "FASTSCAN Cobra + Scorpion", Apr. 2005, Polhemus, Colchester, VT.

GFM, "ILS Intelligenter Lichtschnittsensor", May 24, 2000, GFM Gesellschaft fUr Mel1technik mbH, Aachen, Germany, http://www.gfm-aachen.de/.

Metris. "XC50-LS Cross Scanner", downloaded May 31, 2007, Metris, Leuven, Belgium. http://www.metris.com/cmm_scanners/.

Breuckmann, "StereoScan 3D", Jul. 2006, Breuckmann.com.

GOM, "ATOS", downloaded May 31, 2007, GOM mbH, Braunschweig, Germany. C:\documents\HHTLG\clients\1007 B I G\003 wireless Spraylight\RCE\GOM—Measuring Systems—ATOS.mht.

International Preliminary Report on Patentability issued in International Application PCT/US2012/033466, having a mailing date of Oct. 24, 2013.

* cited by examiner

OPTICAL DIGITIZER WITH IMPROVED DISTANCE MEASUREMENT CAPABILITY

RELATED APPLICATIONS

This application claims the benefit of priority to U.S. Provisional Application No. 61/475,034, filed Apr. 13, 2011, the entire contents of which are incorporated herein by reference.

FIELD

The present invention relates generally to three-dimensional digitizer systems, and more particularly to three-dimensional digitizers with optical sensors that further include an additional distance measuring device.

BACKGROUND

Various systems and methods exist for using optical instruments to measure position in a three-dimensional space. These systems and methods may convert the position measurements into digital form and plot the measurements over time to trace various shapes and forms. For example, these systems may operate as a digitizing pointer held by hand and used to trace structures for reverse-engineering, sizing purposes, medical procedures, or motion tracking.

A variety of commercially available optical digitizer systems are available that determine x, y, z coordinates of markers in 3D space. These markers can be reflective markers, reflecting light waves back to the sensors of the system, or active markers actively directing light waves to the sensors. These systems also determine directional vectors of rigid bodies when the markers are attached to them.

A three-dimensional optical digitizer (such as the 3D Creator™ system from Boulder Innovations Group, Inc. of Boulder, Colo.) obtains x, y, z, coordinates of a marker by triangulation using optical sensors arrayed along a baseline. When the distance to the marker is much greater than the length of the baseline, the accuracy of the distance coordinate (typically the z coordinate) is diminished over that of the transverse coordinates (typically the x and y coordinates).

SUMMARY

Various embodiments include a method of determining spatial coordinates in three dimensional space that includes obtaining initial spatial coordinate values for at least two dimensions using an optical sensor system, measuring a distance to an object using a non-contact distance measurement device, and combining the initial spatial coordinate values with the measured distance to obtain spatial coordinate values for three dimensions. The spatial coordinate values may correspond to a point on a body, such as a probe, a human, an animal or any other body to be tracked, and the distance to the object may comprise a distance to a point on the body. The initial spatial coordinate values may be obtained via triangulation, and the distance to the object may be measured by direct ranging.

In further embodiments, the initial spatial coordinate values may be obtained for two dimensions that are transverse to the optical sensor system (e.g., x and y dimensions), and a coordinate value for a third dimension (e.g., the z dimension), which may be a distance from the optical sensor system, may be determined by combining the initial spatial coordinate values with the measured distance.

In further embodiments, the initial spatial coordinate values may be obtained for three dimensions (e.g., x, y and z dimensions), and combining the initial spatial coordinate values with the measured distance may include replacing an initial spatial coordinate value for one dimension (e.g., the z dimension) with a new spatial coordinate value based on the measured distance.

In further embodiments, an ambiguity in the distance measurement may be resolved by using an initial spatial coordinate value to determine a distance measurement value. The distance measurement value may then be used to replace the initial spatial coordinate value with a new spatial coordinate value.

In further embodiments, the distance measurement may include directing a first electromagnetic signal (e.g., an optical and/or radio frequency signal) into the measurement volume, receiving a second electromagnetic signal from the measurement volume, and determining a distance to the object based on the received second electromagnetic signal. The distance measurement may be based on time-of-flight, phase shift and/or an interferometry-based technique. In some embodiments, the second signal may be a reflected signal, and the reflected signal may be reflected by the object, or by a reflective element provided in a known position relative to the optical sensor system. In some embodiments, the second signal may be a retransmitted signal, where the first signal may be received, optionally amplified, and retransmitted to provide the second signal. The second signal may be retransmitted at a different frequency than the frequency of the first signal. In various embodiments, both the first signal and the second signal may be transmitted from and received at a known position relative to the optical sensor system. In other embodiments, both the first signal and the second signal may be transmitted from and received at a position located on the object.

In further embodiments, the distance measurement may include referencing the relative positions of the object and the optical sensor system, transmitting an electromagnetic signal into a measurement volume, receiving the signal, and determining a distance to the object based on the received signal. In some embodiments, the signal may be transmitted from a known position relative to the optical sensor system and received at the object. In other embodiments, the signal may be transmitted from the object and received at a known position relative to the optical sensor system.

Various embodiments further include a system for determining spatial coordinates in three dimensional space that include an optical system configured to obtain initial spatial coordinate values for at least two dimensions, a non-contact distance measuring device configured to measure a distance to an object located in the three dimensional space, and a processing device configured to combine the initial spatial coordinate values with the measured distance to obtain spatial coordinate values for three dimensions. The optical sensor system may comprise at least one optical sensing element for obtaining spatial coordinate data of a marker, which may be located on the object, such as a probe. The marker may be configured to emit or reflect optical radiation, and the at least one optical sensing element, which may be a CCD or CMOS based sensing element, may be photosensitive to the radiation from the marker.

In further embodiments, the distance measuring device may include a time-of-flight detector configured to determine a time delay between a transmitted signal and the same signal remotely received and transmitted or reflected back to the detector. In further embodiments, the distance measuring device may include a phase-shift detector configured to determine a phase shift difference between a transmitted signal and the same signal remotely received and transmitted or reflected back to the detector. In further embodiments, the distance measuring device may include an interferometer-type detector configured to determine an interference between a transmitted signal and the same signal remotely received and transmitted or reflected back to the detector.

In further embodiments, the distance measuring device may include a first portion in a known position relative to the optical sensor system and a second portion on the object. In some embodiments, the first portion may include a transmitter of electromagnetic radiation and the second portion may include a receiver of electromagnetic radiation. In some embodiments, the second portion may include a transmitter of electromagnetic radiation and the first portion may include a receiver of electromagnetic radiation. In some embodiments, the first portion may include both a transmitter and a receiver of electromagnetic radiation, and the second portion may also include both a transmitter and a receiver of electromagnetic radiation.

Various embodiments further include a system for determining spatial coordinates in a three dimensional space that includes a non-contact distance measuring device having at least one transmitter configured to direct a first electromagnetic radiation signal into the three-dimensional space, at least one marker affixed to an object in the three-dimensional space, the marker being configured to receive the first signal and to transmit a second electromagnetic radiation signal, a plurality of receiver devices in a known fixed geometric relation, wherein each receiver device is configured to receive the second signal from the at least one marker and based on the received second signal measure a distance from the receiver device to the at least one marker, and a processing device configured to determine spatial coordinate values for the marker in three dimensions based on the measured distances. The first signal and the second signal may be radiofrequency signals, and the spatial coordinate values may be determined when a light of sight between the marker and at least one receiver device is obstructed.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

Various embodiments include systems and methods for improving the accuracy of spatial coordinate measurements by optical digitizers by obtaining a separate distance measurement, which may be via direct ranging rather than triangulation, and combining the distance measurement with the spatial coordinate measurements to improve the accuracy of the three-dimensional spatial coordinate measurement.

Figure 1:
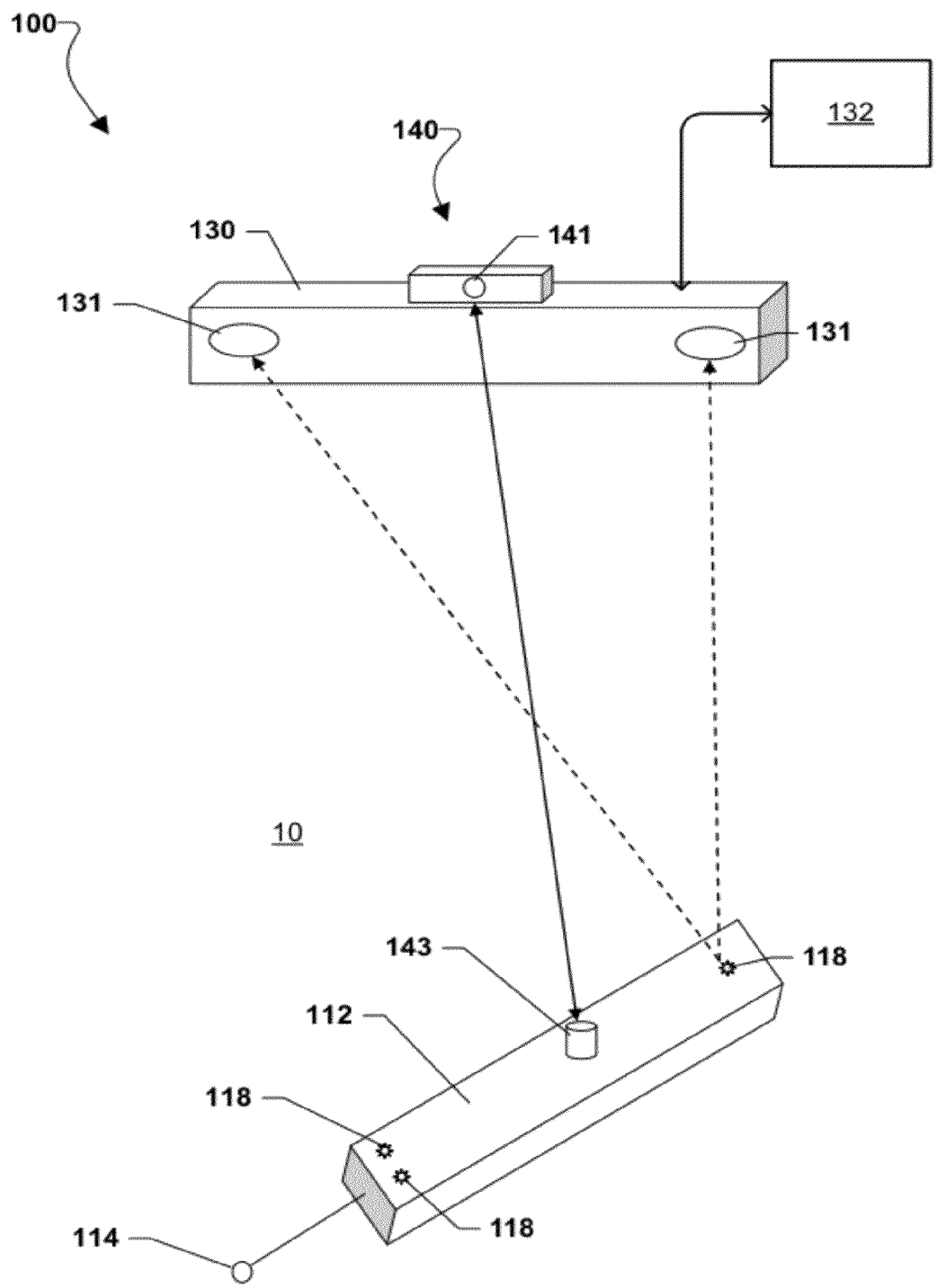
FIG. 1 is a schematic illustration of an embodiment optical system for determining spatial coordinates having a distance measuring device.

An embodiment system 100 for determining spatial coordinates and/or orientation in three-dimensional space, indicated at 10, is illustrated in FIG. 1. In general, the system 100 may use optical instruments to measure position (including location and/or orientation) in a three-dimensional space. In exemplary embodiments, the system 100 includes a three-dimensional digitizer that converts the position measurements into digital form and plots the measurements over time in order to, for example, trace various shapes or forms or to track the motion of objects, including humans, instruments and such, in 3D space.

The optical system 100 illustrated in FIG. 1 includes one or more markers 118 that may be affixed to a body 112 to be measured and are configured to emit and/or reflect electromagnetic radiation, and a sensor system 130 having at least two optical sensors 131, which may be, for example, cameras, charge coupled devices (CCDs) or active pixel sensor (APS) devices such as CMOS sensors, and which are photo-sensitive to the radiation from the marker(s) 118. A processing device 132 may be electronically coupled to the sensor system 130 and may be configured to receive input of data from the sensor system 130 and from these data, the processing device 132 may calculate the x, y, z coordinates of each marker 118 that appears as a substantial point source of radiation In some cases, the processing device 132 may calculate x, y, z and vector data, and use these data for further processing and/or display. In certain embodiments, the processing device 132 may use the computed coordinates of each marker 118 and a known geometry of the body 112 to compute the location and orientation of the body 112, as well as any point on the body 112, such as a tip 114. The processing device 132 may also determine the unit 3D vector describing the longitudinal direction of the body 112 (which is one aspect of the orientation of the body). If more than two non-collinear markers 118 are disposed on the body 112, a transverse 3D vector can also be computed to describe the rotational orientation of the body or its yaw-pitch-and-roll angles.

In embodiments, the processing device 132 may be a dedicated processing device having hardware, software and/or firmware components configured to perform the various functions described above. The processing device 132 may also include a control module for controlling the operation of the imaging system 100. The processing device 132 may be combined with the sensor system 130 in a single device or housing. In some embodiments, some or all of the functions described above in connection with the processing device 132 may be performed by a computer, such as a general-purpose computer having a memory and programmable microprocessor as is well-known in the art. In some embodiments, the processing device 132 may be a computer. In other embodiments, a dedicated processing device 132 may be electronically coupled to a computer, such a laptop, tablet, or other computing device, to display calculated position data or otherwise process the data for use in a software application, such as a CAD program or custom-designed medical or tracking application.

In the embodiment shown in FIG. 1, the body 112 may be a probe, which may be a handheld probe, having one or more markers 118 fixed at one or more known position(s) on the probe. The marker(s) 118 may be energy emitters, and may comprise active light emitting elements, such as light emitting diodes (LEDs). The marker(s) 118 and/or the body 112 (e.g., probe) to which the marker(s) are attached may include a power source (e.g., a battery) and circuitry configured to cause the light emitting element(s) of the marker(s) to emit light, and the light may be emitted in a pre-defined sequence of light flashes.

In alternative embodiments, one or more marker(s) 118 may be passive elements that may reflect radiation (e.g., light) directed from an external source (not shown) into the 3D space 10, where the reflected radiation from the marker(s) 118 may be detected by the sensor system 130.

The radiation emitted/reflected by the marker(s) 118 may be optical radiation, and may have any suitable wavelength that may be detected by the sensor system 130. In embodiments, the optical radiation may be visible light. In some embodiments, such as where flashing visible light would cause disturbance to human operators, the optical radiation may be infrared light.

In embodiments, a body 112 in the form of a probe may have attached to it a rigid tip (e.g., for touch measurements), a laser ranger (e.g., for non-contact measurements), and/or a laser scanner (e.g., for surface modeling). The body 112 may be mechanically manipulated and orientated under software control by, for example, mounting it on a robotic arm or other manipulator. In addition to a probe, the one or more markers 118 may also be attached to any other body to be tracked, such as a human or animal body or any other suitable moving or stationary object.

The sensor system 130 in optical digitizer systems typically consists of charge-coupled devices (CCD) or CMOS sensor elements 131 that detect the incident light and determine the pixel numbers the light falls on. Very often the center of the light beam detected is determined to sub-pixel values. The value so obtained may used to determine the angle to the source of the light energy (e.g., marker 118), whether the energy is reflected or actively emitted, by knowing the geometry of the sensor optics. The angles are then used to determine the location of the light source (e.g., marker 118) in the x, y and z dimensions through triangulation.

In order for the system to be able to triangulate, multiple sensor elements 131 may be used that are physically separated from each other by known distances. When area array CCDs or image sensors made with the Complementary metal—oxide—semiconductor (CMOS) process (referred to herein as "CMOS sensors") are used (i.e., sensors that have two dimensions with multiple pixels in both rows and columns), a minimum of two sensor elements 131 are conventionally needed. When line sensors are used (single dimensional device with a single row of pixels), a minimum of three sensor elements 131 are typically needed.

A shortcoming of conventional optical digitizer systems is that the two dimensions in a plane in front of the sensors (up and down and left and right, commonly denoted the x and y dimensions) are measured by angles incident to the sensors. The distance from the sensor (commonly denoted the z dimension) is derived from the x and y measurement by calculating the angle to the outer-most sensor elements 131. In a three-sensor, single dimensional system for instance, the three sensor elements 131 are commonly built into a sensor array with the three sensor elements 131 in line with each other along a "baseline." The z-value of the marker is determined by the x and y measurements and the angle of the incident radiation to the two outside sensor elements 131 on the sensor array. The shortcoming of a system like that is that the accuracy of the z measurement depends heavily on the distance between the two outside sensor elements 131. Outside sensor elements 131 that are very close together result in an angle between them and the marker 118 that is very narrow, limiting system accuracy. This effect is exaggerated as the distance to the marker 118 increases. The result is that for distant markers 118, the measurement error is mostly due to the error in the z dimension. In order to decrease this z-error, the distance between the two outside sensor elements 131 has to be increased, which may be impractical due to the very large sensor array that would result.

The various embodiments include systems and methods of reducing the z error, and thus greatly reducing the total Euclidean error of the measuring system, without having to increase the distance between the outside sensors. The various embodiments include a separate distance measuring system 140 that is added to the existing optical digitizer system 100. The existing digitizer system 100 may obtain its regular x, y and z measurements, such as via triangulation. A separate distance measurement (e.g., z dimension distance measurement) may be obtained by the distance measuring system 140. The separate distance measurement may be combined with the optical digitizer measurements, and in some embodiments the separate distance measurement may replace the original, error-prone z measurement, to improve overall system accuracy.

As shown in FIG. 1, a distance measuring device 140 in various embodiments may include a first portion 141 that may be provided in a known fixed geometric relation to the sensor system 130, and a second portion 141 that may be provided on the body 112 having one or more markers 118 affixed thereto. The second portion 130 may be in a known fixed geometric relation to the one or more markers 118 and/or to the body 112 or a portion thereof, such as tip 114 of the body 112. As described in further detail below, various embodiments of the distance measuring device 140 may be used to measure a distance between the first portion 141 and the second portion 143 of the device 140. The measured distance value may be provided to the processing device 132 which may use the measured distance value to improve the accuracy of the calculated spatial coordinates.

Figure 2:
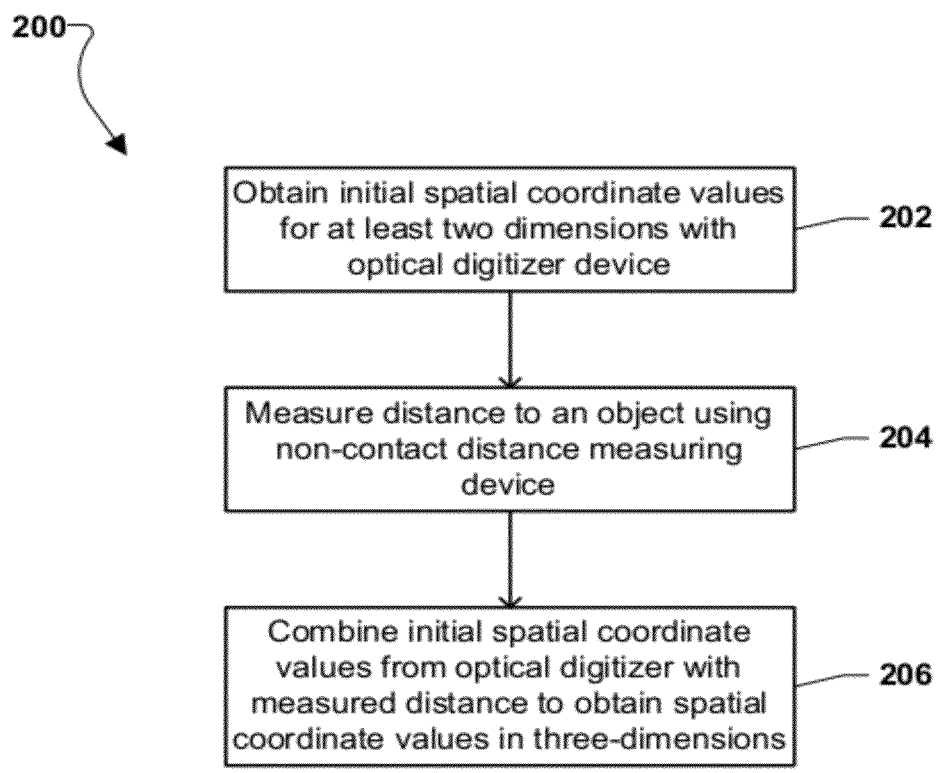
FIG. 2 is a process flow diagram of an embodiment method for determining spatial coordinates.

FIG. 2 is a process flow diagram illustrating an embodiment method 200 for determining spatial coordinates in a three dimensional space. The spatial coordinates may correspond to one or more points on a body 112, such the location of a marker 118 or a tip 114 or other portion of the body 112. In block 202 of embodiment method 200, initial spatial coordinate values may be obtained for at least two dimensions with an optical digitizer device, such as optical digitizer device 100 described above with reference to FIG. 1. The optical digitizer device 100 may determine, for example, x and y coordinate values of a point, and in preferred embodiments may determine x, y, and z coordinate values for one or more points on the body 112 in a conventional manner (e.g., via triangulation using optical sensors). In block 204, a distance to an object in the three-dimensional space may be measured using a non-contact measuring device, such as the distance measuring device 140 shown in FIG. 1. The distance measurement may be via direct ranging as opposed to triangulation, and may be performed generally concurrently with the obtaining of initial spatial coordinate values by the optical digitizer. The distance to an object may correspond to a distance from the sensor system 130 of the optical digitizer to the body 112 being simultaneously tracked by the digitizer. In block 206, the initial spatial coordinate values from the optical digitizer may be combined with the measured distance to obtain spatial coordinate values in three dimensions. In embodiments, the measured distance value may be the spatial coordinate value in at least one dimension, such as the z dimension, or may be used to calculate the spatial coordinate value in at least one dimension (e.g., the z dimension). In embodiments, the measured distance value may be used to replace the z dimension coordinate value in the initial spatial coordinate values.

The distance measuring device 140 described above in connection with FIGS. 1 and 2 may be any suitable device for non-contact measurement of a distance to an object. Laser distance measurement devices using time-of-flight, phase shift and interferometer distance measurement have been known for some time and commercial devices are available. U.S. Pat. No. 3,733,129, now expired, describes such a time-of-flight system. Such systems may include a laser source transmitting a laser beam that is reflected off a target. The reflected beam is received by the sensor, and the distance to the reflective target may be determined by one of at least three methods: time-of-flight, phase shift, and inteferometery. Such a laser-based system may provide a distance measurement that may be used to replace the z-measurement of an optical digitizer, although existing systems typically utilize a focused laser that has to be pointed at the target, which may not be practical in an optical digitizer system, where the position of the target (e.g., marker 118) may be unknown and/or moving within the measurement volume 10.

Existing optical digitizers determine the x, y, z coordinates of markers 118, or rigid bodies 112 containing the markers 118 anywhere in the 3D space 10 in front of the sensor elements 131, without the restriction of a beam having to know where the markers are in order to shine light onto them. Typically the body 112 is a measuring probe, or an object or human with markers attached to it that is moving in the 3D field. A narrow laser or light beam would have to be moved to always hit the body in order to detect the reflected light. Systems do exist where rotating scanner heads are used to project laser beams in all directions in order to cover the entire volume of which distances are to be measured, so-called LIDAR devices. However, such systems obtain distances from all the surfaces off of which the beams are reflected. Since only the distance to a distinct point on a body or a few distinct points on the body are to be determined, such scanners may not be desirable for such applications. Further, a need exists for such a measurement to be taken when the optical beam could be obstructed by a non-transparent object.

Various embodiments of a distance measuring device 140 may include a system in which a wide-angle beam of electromagnetic radiation (e.g., in optical or radio frequencies) is directed into the 3D measurement space 10, preferably over the entire volume of the measurement space 10. Referring to FIG. 1, a first portion 141 of the distance measuring device 140 may include a transmitter that may generate the wide-angle beam of electromagnetic radiation. The first portion 141 may also include a receiver that may detect electromagnetic signals returning from the measurement space 10 such that the detected signals may be used to calculate a distance measurement value using a suitable technique, such as time-of-flight, phase-shift or interferometry techniques as are known in the art. A second portion 143 of the distance measuring device 140 may include a receiver that is configured to receive the electromagnetic signal sent from the first portion 141, to amplify the signal and then retransmit the signal using a transmitting device, such as a transponder, that may be included in the second portion 143. The receiver in the first portion 140 may thus receive both reflections from objects within the measurement space 10 as well as the retransmitted signal from the second portion 143 of the distance measuring device 140. Such a retransmitted signal may be much stronger than the background reflections. The difference in intensity may be used by the system to discriminate between the reflected signals and the signal retransmitted from the second portion 143. The detected signal from the second portion 143 may be used to measure the distance between the first portion 141 and the second portion using any suitable technique (e.g., time-of-flight, phase-shift, interferometry, etc.). Since the first portion 141 may be in a known fixed geometric relation with respect to the optical digitizer sensor system 130, and the second portion 143 may be in a known fixed geometric relation with respect to the body 112 being tracked by the optical digitizer, the measured distance may thus be used to accurately measure the distance between the optical digitizer sensor system 130 and the body 112 being tracked.

In some embodiments which may be useful for applications in which more distinct discrimination is required, the electromagnetic signal used for the distance measurement may be transmitted by the first portion 141 of the distance measuring device 140 on a first frequency and may be retransmitted by the second portion 143 on a second, different frequency. This may enable the first portion 141 to receive reflected signals on the transmitted frequency and the retransmitted signals on the different frequency, which may aid in identifying the retransmitted signal-of-interest. In embodiments, the distance measuring device 140 may include multiple second portions 143, which may be located on different positions on a body 112. Each of the second portions 143 may receive the signal from the first portion 141 and retransmit the signal using a different frequency, and each frequency may be unique to a particular position on the body 112. The retransmitted signals may be received at the first portion 141, which may be used to measure the distances to each of the particular positions on the body 112. This embodiment may also enable distance measurements to be made to more than one body 112 in the measurement field 10 at the same time by providing multiple second portions 143, each using different frequencies for retransmitting the signal from the first portion 140 from each of the rigid bodies 112.

The electromagnetic signals transmitted from the first portion 141 and/or retransmitted from the second portion 143 of the distance measuring device 140 may be any suitable electromagnetic signal that may be directed over a relatively wide area or volume, and may be, for instance, radio signals and/or optical signals (e.g., visible, IR signals, etc.). A focused beam of electromagnetic radiation, such as a focused laser beam, may not be practical in some embodiments, although laser-based optical systems using divergent beams may be utilized as described in further detail below.

In embodiments using a time-of-flight distance measuring technique, the first portion 141 may include a time-of-flight detector configured to determine a time delay between a transmitted signal and the same signal remotely received and transmitted or reflected back to the first portion 141. In embodiments using a phase-shift distance measuring technique, the first portion 141 may include a phase-shift detector configured to determine the phase shift difference between a transmitted signal and the same signal remotely received and transmitted or reflected back to the first portion 141. In embodiments using an interferometry distance measuring technique, the first portion 141 may include an interferometer-type detector configured to determine the interference between a transmitted signal and the same signal remotely received and transmitted or reflected back to the first portion 141.

Various embodiments may also include methods for resolving ambiguity in the measured distance from the distance measuring device 140. In laser-based systems, for example, phase-shift and interferometry based distance measurement methods may result in ambiguities when the measured distance is increased and the phase shift in these systems crosses over zero. In those cases, the systems are incapable of measuring the distance without ambiguity. In order to solve such problems, existing systems send out signals with different wavelengths which result in the phase shifts crossing zero at different distances. In various embodiments, the ambiguities may be resolved by using the z-measurement of the optical digitizer, which even though it may not be accurate enough for the desired spatial coordinate measurement, may be accurate enough to resolve the ambiguity in the distance measurement.

Figure 3:
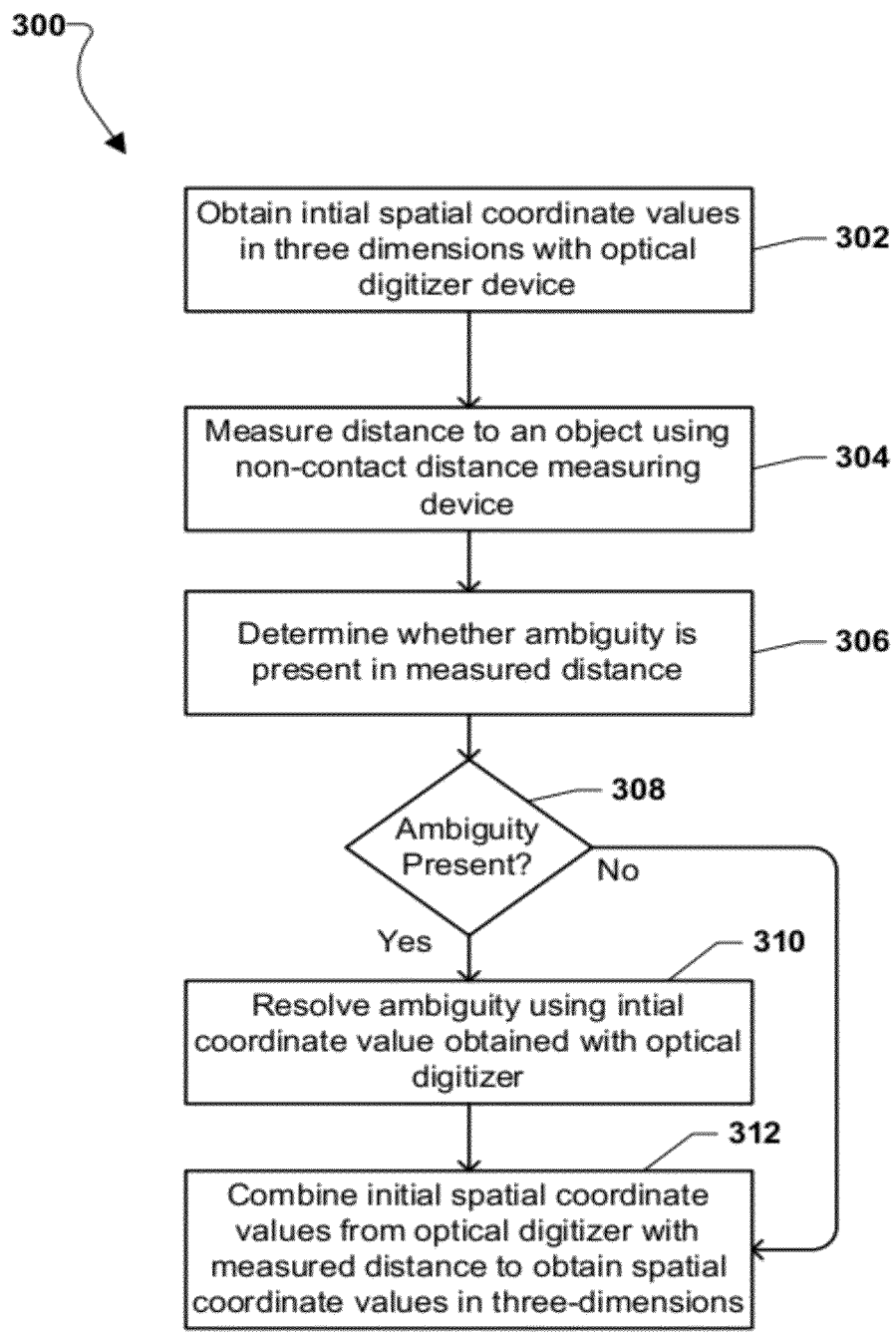
FIG. 3 is a process flow diagram of an embodiment method for determining spatial coordinates in which ambiguities in a distance measurement may be resolved.

FIG. 3 is a process flow diagram illustrating an embodiment method 300 for determining spatial coordinates in a three dimensional space in which an ambiguity in a distance measurement value may be resolved using a value obtained from an optical digitizer system. In block 302, initial spatial coordinate values may be obtained in three dimensions using an optical digitizer device 100, as described above. In block 304, the distance to an object in the 3D measuring space may be measured using a non-contact distance measuring device 140. The distance measuring device may a laser-based distance measuring device (e.g., laser ranger), and may use a phase shift and/or interferometry technique for measuring the distance to the object. As described above, these types of distance measurement techniques may result in ambiguities, such as when the measured distance is increased and the phase shift in these systems crosses over zero. In block 306 of method 300, a determination is made whether an ambiguity is present in the measured distance. If there is no ambiguity (i.e., determination block 308="No"), the initial spatial coordinate values from the optical digitizer may be combined with the measured distance to obtain spatial coordinate values in three dimensions in block 312. As described above, the measured distance value may be used to replace the spatial coordinate value in at least one dimension (e.g., the z dimension) to provide spatial coordinate values in three dimensions with improved accuracy. If it is determined that there is an ambiguity in the measured distance (i.e., determination block 308="Yes"), an initial spatial coordinate value obtained by the optical digitizer may be used to resolve the ambiguity in block 310. For example, where the distance measurement calculation indicates that there is an ambiguity (e.g., there exist two or more potentially valid solutions to the distance measurement computation), the initial spatial coordinate value obtained by the optical digitizer may be used to determine which potential solution is actually the correct distance measurement. In some embodiments, the initially-obtained coordinate value in the z dimension may be sufficiently accurate to serve as a useful proxy for the distance measurement value. Thus, when there is ambiguity in the measured distance computation, the ambiguity may be resolved by selecting the value of the measured distance that is closest to the z dimension value initially obtained with the optical digitizer. In block 312, the initial spatial coordinate values from the optical digitizer may be combined with the selected measured distance value to obtain spatial coordinate values in three dimensions. In some embodiments, the measured distance value may be used to replace the initial z dimension coordinate value with a more accurate value.

Referring once again to FIG. 1, in further embodiments the direction of signal travel in the distance measuring device 140 may be reversed so that the first portion 141 may be located on the body 112, which may be a probe, and the second portion 143 may be located on, or in a known fixed geometric relationship with, the optical sensor system 130. Thus, the first portion 141 on the body 112 may initiate the distance measurement by transmitting an electromagnetic signal, and the second portion 143, which may be positioned on or fixed relative to the optical sensor system 130, may receive and retransmit the signal back to the first portion 141 on the body 112. The first portion 141 may receive the retransmitted signal and determine a distance measurement using any suitable technique (e.g., time-of-flight, phase shift, interferometry, etc.). In this embodiment, the optical sensor system 130 may obtain the initial x, y and z optical measurement and the body 112 or probe may obtain the distance measurement that may be used to replace or modify the z value in the final coordinate values. Some means of communication between the body 112 or probe and processing device 132, such as a wired or wireless communication link, may be used to consolidate the measurements.

Figure 4:
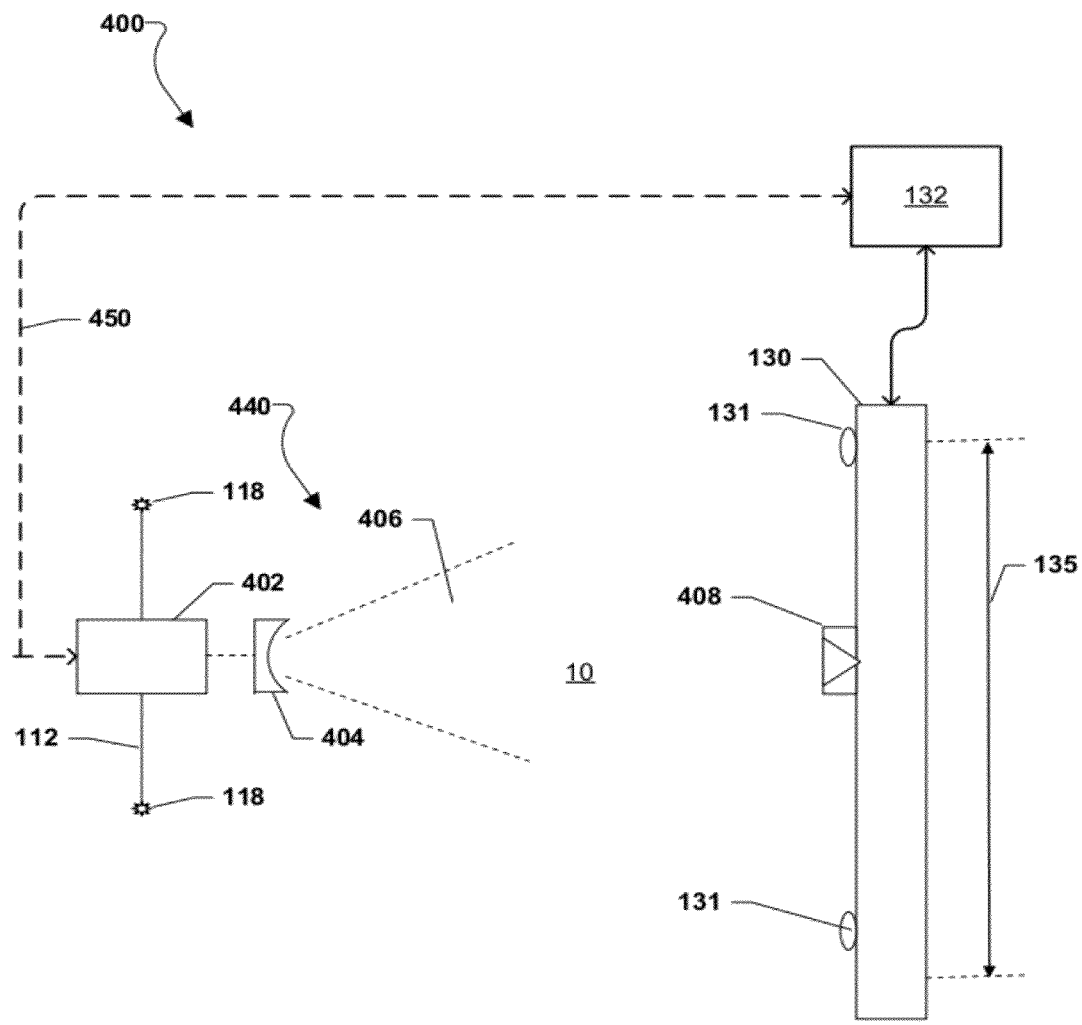
FIG. 4 is a schematic view of an embodiment optical system for determining spatial coordinates having a distance measuring device using a wide angle optical radiation beam to measure a distance.

FIG. 4 schematically illustrates a further embodiment of a system 400 for determining spatial coordinates and/or orientation in three-dimensional space. As in the system illustrated in FIG. 1, the system 400 may include an optical digitizer having one or more markers 118 affixed to a body 112 that emit and/or reflect electromagnetic radiation, and an optical sensor system 130 having one or more optical sensor elements 131 which are photo-sensitive to the radiation from the marker(s) 118. In some embodiments, the optical sensor system 130 may comprise a sensor bar having two or more sensor elements 131 arranged along a baseline 135. In an alternative embodiment, the sensor system 130 may include a single 2D sensor element 131, such as a 2D CCD sensor with a focusing lens. A processing device 132 may be electronically coupled to the sensor system 130 and may calculate the x, y, z coordinates of each marker 118 that appears as a substantial point source of radiation via triangulation, for example.

The system 400 illustrated in FIG. 4 may further include a distance measuring device 440 that may utilize a wide beam 406 of optical radiation, which may be a wide angle laser beam, to measure the distance between the body 112 and the optical sensor 130. The body 112, which may be a probe, such as a handheld probe, may include an optical transmitter/receiver device 402. The transmitter/receiver device 402 may include a radiation source, such as a laser, which may be of a type used in conventional laser ranging devices (e.g., the Fluke 416D Laser Distance Meter from Fluke Corp. of Everett, Wash.). The radiation source may be optically coupled to a beam diverger 404, which may be a lens or holographic diffuser, for example. In one embodiment, the beam diverger 404 may be a plano-concave lens (e.g., 25 mm diameter, 50 mm focal length). A reflective element 408, which may be a retroreflector such as a corner cube, a corner cube array, a piece of retroreflective tape, etc., may be provided on, or in a known fixed relation to, the optical sensor array 130.

In operation, optical radiation, which may be a laser beam, from transmitter/receiver device 402 may be passed through the beam diverger 404 to generate a diverged beam 406. The diverged beam 406 may be easily directed or aimed in the direction of reflective element 408. The ease of aiming may be further enhanced if the optical radiation is of a visible wavelength. Ease of aiming may be particularly important, for example, when the body 112 is a handheld probe. A portion of the beam 406 is reflected by the reflective element 408 and the reflected portion of the beam may be received by receiver of the transmitter/receiver device 402 located on the body 112. The reflected beam received at transmitter/receiver device 402 may be used to measure a distance from the body 112 to the reflective element 408 using any suitable technique, such as time-of-flight, phase shift, interferometry, etc. The measured distance may be provided to a processing device 132 using a communication link 450, which may be a wireless communication link. The distance measurement may be made substantially concurrent with the measurement of the x, y, z spatial coordinates of the marker(s) 118 in three-dimensional space by the optical sensing system 130. As in the embodiments described above with reference to FIGS. 1-3, the separate distance measurement may be combined with the optical digitizer measurements, and in some embodiments the separate distance measurement may be used to replace the original, error-prone z measurement, to improve overall system accuracy.

In various embodiments, the body 112 may be in the form of a probe that may have attached to it a rigid tip (e.g., for touch measurements), a second laser ranger (e.g., for non-contact measurements of another object or surface in the measurement space 10), and/or a laser scanner (e.g., for surface modeling). The probe may be mechanically manipulated and orientated under software control by, for example, mounting it on a robotic arm or other manipulator.

In an alternative embodiment of the distance measuring device 440, the reflective element 408 may be provided on the body 112, and the optical transmitter/receiver device 402 and beam diverger 406 may be located on, or in a known fixed relation to, the optical sensor system 130. This configuration may be similar to the configuration shown in FIG. 1, and a wide beam of optical radiation may be transmitted from a fixed position relative to the optical sensor system 130 into the measurement volume 10, where a portion of the beam may be reflected back from the reflective element 408 on the body 112, detected by the transmitter/receiver device 402, and the detected reflected signal may be used to measure a distance to the body.

In various embodiments, the optical digitizer may obtain spatial coordinate values in two dimensions (e.g., x and y dimensions), and the spatial coordinate value for the third dimension (e.g., the z dimension) may be obtained by the distance measuring device 140, 440. Such a system may allow the number of optical sensor elements 131 in the optical sensor system 130 to be reduced from a minimum of three to two for a single-dimensional sensor element (e.g., a CCD or CMOS sensor element), and from two to one for a 2D area sensor. In order to resolve ambiguities due to phase shift overrun, signals with different wavelengths may be transmitted by the distance measuring device In various embodiments, a simplified distance measuring device 140, 440 may transmit electromagnetic (optical or radio frequency) signal in only one direction. For example, a transmitter may be provided on the body 112 being tracked and a receiver may be provided on, or in a known fixed geometry relation with, the optical sensor system 130. Alternatively, the transmitter may be provided on or in fixed relation to the optical sensor system 130, and the receiver may be provided on the body 112. In either case, a reference is required in order to reference the signal received at the receiver, which is used to provide the distance measurement. The reference may be established before the distance measurement begins by bringing the receiver and transmitter into physical or close contact with each other. The two objects may be referenced by having them at a known and fixed location to each other, e.g., distance 0 mm apart. This reference may start the distance measurement and the distance may be noted as 0, or whatever other distance the reference is set at. As the two objects (receiver and transmitter) are moved apart the receiver will measure the distance to the transmitter and deduct the reference distance.

Figure 5:
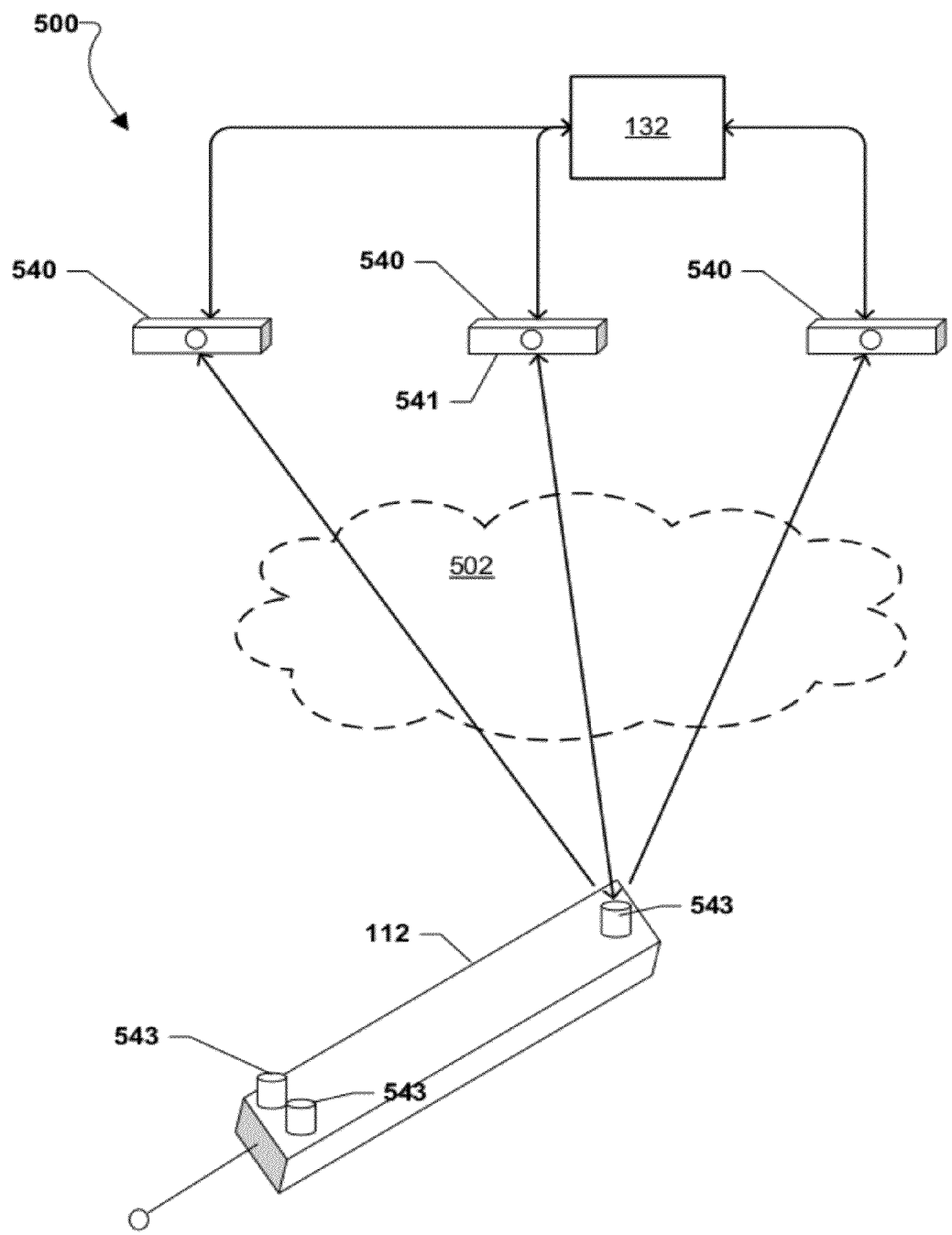
FIG. 5 is a schematic view of an embodiment optical system for determining spatial coordinates using at least three distance measuring devices.

FIG. 5 schematically illustrates a further embodiment of a system 500 for determining spatial coordinates and/or orientation in three-dimensional space using radio frequency signals. If measurements to markers that are obscured from view (such as via obstruction 502 shown in FIG. 5) are to be obtained, radio frequency signals may be used instead of light frequencies. In such embodiments, only the z-measurement will be able to be obtained to obscured markers, since the existing optical digitizers relying on a clear optical path from the markers will still require visible line-of-sight. In order to obtain x, y and z measurements to obscured markers, a system including three or more distance measurement devices 540 in a known fixed geometry using at least one radio frequency transmitter 541 may be utilized. In one embodiment, an electromagnetic transmitter 541, which may be installed on a measuring device 540, transmits a signal to one or more markers 543 on a body 112 of which the x, y, z coordinates and directional vectors are to be obtained. For example, as described above with reference to FIG. 1, the marker 532 on the body 112 may comprise a transponder that is configured to receive, amplify, and retransmit the signal to the measuring devices 140. Each of the measuring devices 140 may contain a receiver that receives the retransmitted signals from the marker(s) 543, and may determine the distance to each marker 543 using known distance measuring technique(s). In embodiments, the system 500 may contain no optical sensor elements (e.g., CCDs or CMOS sensor elements) and the measured bodies 112 may contain no optical markers that are imaged. Instead, the x, y and z coordinates and derived directional vectors may be calculated based on triangulation. Visible light may also be used in such systems, but measurement would be limited to non-obscured receivers.

Figure 6:
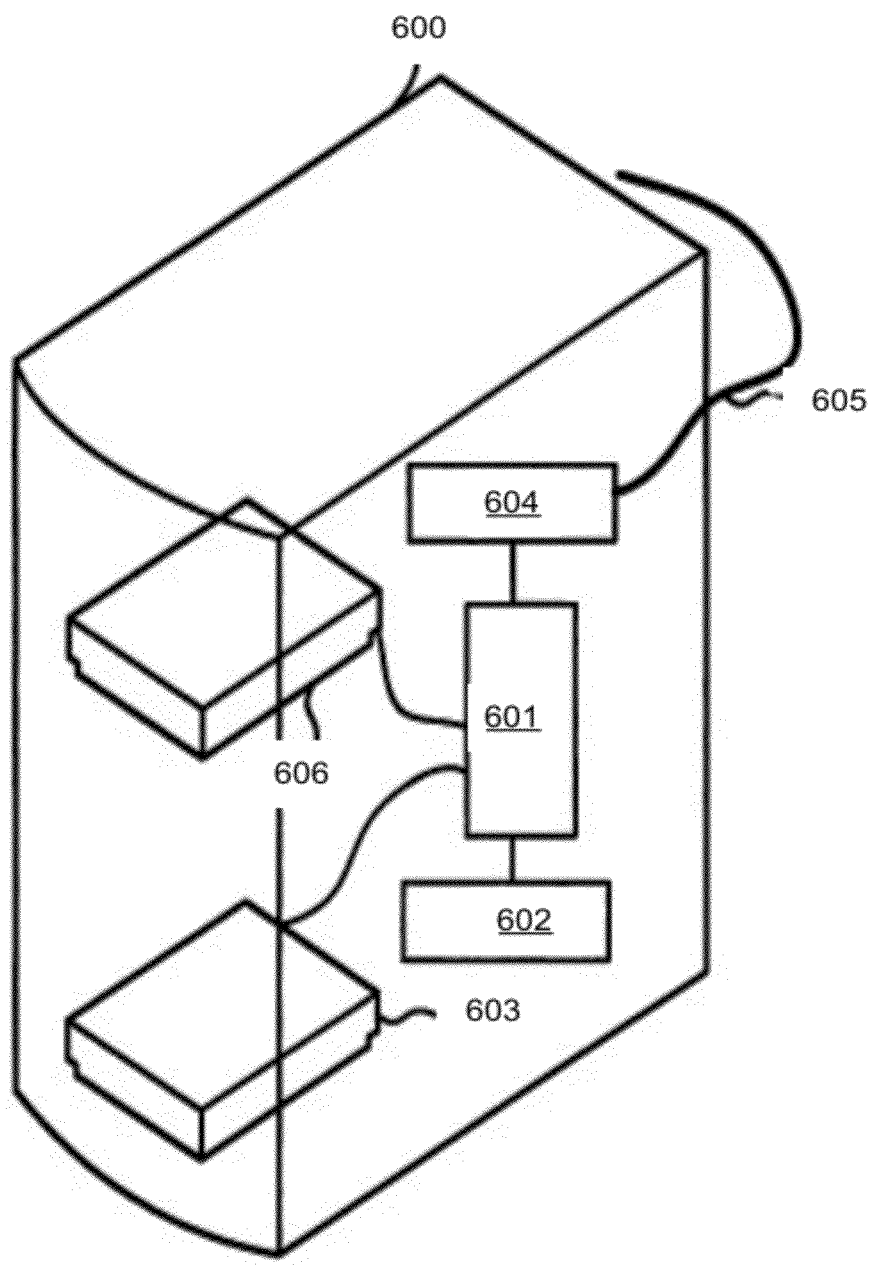
FIG. 6 is a component block diagram of an example computer suitable for use with various embodiments.

A number of the embodiments described above may also be implemented using a variety of commercially available computers, such as the computer 600 illustrated in FIG. 6. Such a computer 600 typically includes a processor 601 coupled to volatile memory 602 and a large capacity nonvolatile memory, such as a disk drive 603. The computer 600 may also include a USB memory device and/or a compact disc (CD) drive 606 coupled to the processor 601. The computer 600 may also include network access ports 604 coupled to the processor 601 for establishing data connections with receiver devices and/or a network 605, such as a local area network for coupling to the receiver devices and controllable elements within a digitizing or tracking system.

Computers and processing devices used in the digitizing system for implementing the operations and processes described above for the various embodiments may be configured with computer-executable software instructions to perform the described operations. Such computers may be any conventional general-purposes or special-purpose programmable computer, server or processor. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a non-transitory computer-readable storage medium. Non-transitory computer-readable storage media may be any available media that may be accessed by a computer. By way of example, and not limitation, such non-transitory computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining spatial coordinates in three dimensional space, comprising:
    obtaining initial spatial coordinate values for an object in three dimensions using a signal received from one or more markers associated with the object by an optical sensor system;
    separately measuring a distance to the object using a separate non-contact distance measurement device, wherein the separately measuring a distance to the object is performed separately from the obtaining initial spatial coordinate value for the object in the three dimensions; and
    combining the initial spatial coordinate values for the object in the three dimensions with the separately measured distance to obtain spatial coordinate values for the three dimensions.

2. The method of claim 1, wherein the spatial coordinate values correspond to a point on a body.

3. The method of claim 2, wherein the distance to the object comprises a distance to a point on the body.

4. The method of claim 1 wherein the initial spatial coordinate values are obtained via triangulation.

5. The method of claim 1, wherein the distance to the object is measured via direct ranging.

6. The method of claim 1, wherein combining the initial spatial coordinate values with the separately measured distance comprises determining a coordinate value for a third dimension using the separately measured distance value.

7. The method of claim 6, wherein obtaining the initial spatial coordinate values comprises obtaining initial spatial coordinates for two of the three dimensions that are transverse to the optical sensor system, and wherein the third dimension is a distance from the optical sensor system.

8. The method of claim 1, wherein obtaining the initial spatial coordinate values comprises obtaining initial spatial coordinate values for three dimensions, and wherein combining the initial spatial coordinate values with the measured distance comprises replacing an initial spatial coordinate value for one dimension with a new spatial coordinate value based on the separately measured distance.

9. The method of claim 8, further comprising:
    determining the presence of an ambiguity in the separately measured distance; and
    resolving the ambiguity using an initial spatial coordinate value to determine a value for the separately measured distance.

10. The method of claim 9, further comprising:
    replacing the initial spatial coordinate value with a new spatial coordinate value based on the determined value for the separately measured distance.

11. The method of claim 1, wherein separately measuring a distance to the object comprises:
    directing a first electromagnetic radiation signal into a measurement volume;
    receiving a second electromagnetic signal from the measurement volume; and
    determining a distance to the object based on the received second electromagnetic signal.

12. The method of claim 11, wherein the distance to the object is determined using at least one of a time of flight, a phase shift and an interferometry technique.

13. The method of claim 11, wherein the second electromagnetic signal comprises reflected electromagnetic radiation.

14. The method of claim 11, wherein the electromagnetic radiation is reflected by the object.

15. The method of claim 11, wherein the electromagnetic radiation is reflected by a reflective element provided in a known position relative to the optical sensor system.

16. The method of claim 11, further comprising:
    receiving the first electromagnetic signal; and
    retransmitting the first electromagnetic signal to provide the second electromagnetic signal.

17. The method of claim 16, further comprising:
    amplifying the first electromagnetic signal prior to retransmitting the signal.

18. The method of claim 16, wherein retransmitting the first electromagnetic signal comprises transmitting an electromagnetic signal at a different frequency than the first electromagnetic signal to provide the second electromagnetic signal.

19. The method of claim 11, wherein the first and second electromagnetic signals comprise radiofrequency signals.

20. The method of claim 11, wherein the first and second electromagnetic signals comprise optical signals.

21. The method of claim 11, wherein the first and second electromagnetic signals are transmitted and received from a known position relative to the optical sensor.

22. The method of claim 11, wherein the first and second electromagnetic signals are transmitted and received from a position located on the object.

23. The method of claim 1, wherein separately measuring a distance to an object comprises:
    referencing the relative positions of the object and the optical sensor system;
    transmitting an electromagnetic radiation signal into a measurement volume;
    receiving the electromagnetic radiation signal; and
    determining a distance to the object based on the received electromagnetic radiation signal.

24. The method of claim 23, wherein the electromagnetic radiation signal is transmitted from a known position relative to the optical sensor system and is received at the object.

25. The method of claim 23, wherein the electromagnetic signal is transmitted from the object and received at a known position relative to the optical sensor system.

26. A system for determining, spatial coordinates in a three-dimensional space, comprising:
   an optical sensor system configured to obtain initial spatial coordinate values for an object in three dimensions using signals received from one or more markers associated with the object;
   a separate non-contact distance measuring device configured to separately measure a distance to an object located in the three-dimensional space, the separate non-contact distance measuring device configured to separately measure the distance to an object separately from obtaining the initial spatial coordinates; and
   a processing device configured to combine the initial spatial coordinate values for the object in the three dimensions with the separately measured distance to obtain spatial coordinate values for the three dimensions.

27. The system of claim 26, wherein the optical sensor system comprises at least one optical sensing element for obtaining spatial coordinate data of one of the one or more markers located in the three dimensional space.

28. The system of claim 27, wherein the one of the one or more markers is configured to be located on the object.

29. The system of claim 28, wherein the the one of the one or more markers is configured to emit or reflect optical radiation, and the at least one optical sensing element is photosensitive to the radiation from the marker.

30. The system of claim 28, wherein the at least one optical sensing element comprises a CCD or CMOS based sensing element.

31. The system of claim 26, wherein the separate distance measuring device comprises a time of flight detector configured to determine a time delay between a transmitted signal and the same signal remotely received and returned via at least one of transmission and reflection.

32. The system of claim 26, wherein the separate distance measuring device comprises a phase-shift detector configured to determine a phase shift difference between a transmitted signal and the same signal remotely received and returned via at least one of transmission and reflection.

33. The system of claim 26, wherein the separate distance measuring device comprises an interferometer-type detector configured to determine an interference between a transmitted signal and the same signal remotely received and returned via at least one of transmission and reflection.

34. The system of claim 26, wherein the separate distance measuring device comprises a first portion in a known position relative to the optical, sensor system and a second portion on the object.

35. The system of claim 34, wherein the first portion comprises a transmitter of electromagnetic radiation and the second portion comprises a receiver of electromagnetic radiation.

36. The system of claim 34, wherein the second portion comprises a transmitter of electromagnetic radiation, and the first portion comprises a receiver of electromagnetic radiation.

37. The system of claim 36, wherein the first portion comprises a transmitter and receiver of electromagnetic radiation, and the second portion comprises a transmitter and receiver of electromagnetic radiation.

38. The system of claim 26, wherein the object comprises a probe.

* * * * *